United States Patent [19]

Maciaszczyk

[11] Patent Number: 5,130,516
[45] Date of Patent: Jul. 14, 1992

[54] CHOKE FOR TIG WELDING MACHINES OR PLASMA CUTTING INSTALLATIONS

[75] Inventor: Florian Maciaszczyk, Ebersbach, Fed. Rep. of Germany

[73] Assignee: Rehm Schweisstechnik GmbH u. Co., Fed. Rep. of Germany

[21] Appl. No.: 660,614

[22] Filed: Feb. 25, 1991

[30] Foreign Application Priority Data

Feb. 28, 1990 [DE] Fed. Rep. of Germany ....... 4006201

[51] Int. Cl.$^5$ ............................................... B23K 9/10
[52] U.S. Cl. ............................... 219/130.4; 219/130.1
[58] Field of Search ........... 219/130.4, 130.31, 130.32, 219/130.1; 336/212

[56] References Cited

U.S. PATENT DOCUMENTS

| | | | |
|---|---|---|---|
| 3,663,913 | 5/1972 | Kato et al. | 336/212 |
| 4,103,221 | 7/1978 | Fukui et al. | |
| 4,205,288 | 5/1980 | Lin et al. | 336/212 |
| 4,613,841 | 9/1986 | Roberts | 336/212 |

FOREIGN PATENT DOCUMENTS

| | | |
|---|---|---|
| 2024276 | 1/1971 | Fed. Rep. of Germany . |
| 2435020 | 2/1976 | Fed. Rep. of Germany . |
| 57-19164 | 2/1982 | Japan ............................ 219/130.32 |

*Primary Examiner*—Clifford C. Shaw
*Attorney, Agent, or Firm*—Speckman & Pauley

[57] ABSTRACT

A choke, for TIG welding machines or plasma cutting installations in which clocked current sources and high voltage ignition devices are employed, has a core comprising a combination of transformer plates and ferrite material.

1 Claim, 1 Drawing Sheet

CHOKE FOR TIG WELDING MACHINES OR PLASMA CUTTING INSTALLATIONS

BACKGROUND OF THE INVENTION

1. Field of the Invention

This invention relates to a choke for TIG welding machines or plasma cutting installations in which clocked current sources are used and high voltage ignition devices are employed, where the choke can be simultaneously used as ignition transmitter for the ignition device.

2. Description of Prior Art

In one embodiment of clocked current sources, preferably in welding technology, a smoothing choke is mostly employed at the output to the welding torch. It is also customary to employ an ignition device for generating high voltage pulses parallel to the output, that is, parallel to the arc gap, which cuts across the air gap due to the high voltage and forms an ionized, conducting channel for the welding current. In another embodiment, the choke itself is used as an ignition transmitter. In this case, it is provided with a second coil which is connected to an ignition device. It is of no consequence for the further consideration of this invention as to which one of the two embodiments is selected.

In addition to smoothing, the choke must also block the short ignition pulses by means of its inductance and prevent such a high inductive resistance to it so that the high voltage is not short-circuited. Therefore, the energy of the ignition pulses cannot be too high because it occasionally happens that a welder comes in contact with them. Although he would receive an electrical shock, he should not be hurt by it. In order to obtain as high a voltage as possible with limited energy, it is therefore necessary to make the high voltage pulses very short. A typical pulse has a voltage value of approximately 8 to 10 kV and a duration of 1 to 2 µs. If a smoothing choke does not have sufficient inductance, it puts too large a load on the ignition device and the generated pulse voltage decreases, for example, to 6 kV. This results in a substantial reduction in the ignition capability of the machine.

Thus, two requirements are made on the choke simultaneously:

1. Its inductance must be improved to a point that, as a smoothing choke, at a given switching frequency, for example, 25 kHz, it causes the desired amount of waviness of the output current. Simultaneously the dynamics of current regulation are set and the ohmic resistance of the choke must be small so that no noticeable ohmic losses occur at the choke. If this requirement is to be met, a structural form in the shape of a bar core choke with a core of transformer plates is suggested.

2. Its inductance must be such that it optimally blocks the ignition pulses of the high voltage ignition device. This requirement favors a structure with a ferrite core, which ferrite core is suitable for the high pulse frequency.

The unfortunate fact is that the two inductance values which satisfy these requirements have very little in common because their values are separated, for example, by a factor of 5.

Therefore a choke is required, which, with high frequencies (for example, 500 kHz) and low current (for example, 10 A), has high inductance, and with middle frequencies (for example, 25 kHz) and high current (for example, 30 to 400 A), has reduced inductance, along with minimal resistance.

So-called saturation chokes, where the core is of such a size that it goes into saturation past a set choke current, are known. In such chokes, the inductance falls maximally as low as the inductance of an air choke, depending on the core material selected.

The state of the art is a smoothing choke having a ferrite core. This ferrite core then must be of such a size that it still has, for example, one-fifth of its initial permeability at the end, even under full load current. A substantial amount of ferrite is necessary to satisfy this requirement. Consequently, this solution is correspondingly expensive.

The alternative is to make the core of such a size that as an air choke it has the value which is required for its functioning as a smoothing choke. Subsequently, by inserting a ferrite core for the range of small currents, the inductance is raised, for example, by a factor of 5, so that it blocks the ignition pulses. With higher currents this ferrite core then sharply goes into saturation. However, with this alternative, the size of the choke is not optimal, because an air choke has a considerably larger structure than a choke with core, resulting in disadvantageous increases in ohmic resistance.

Use of a choke in a TIG welding installation is disclosed in German Patent DE 20 24 276, while its use in a plasma cutting machine is disclosed in German Patent DE 24 35 020 A1.

U.S. Letters Patent No. 4,103,221 discloses putting together the core of a coil from different materials in order to compensate for the effect of the dc magnetization on the ac behavior.

SUMMARY OF THE INVENTION

It is an object of this invention to provide a choke of small structural size and low ohmic resistance having as little as possible expensive ferrite material, installation or a plasma cutting installation, as a smoothing choke for the switching frequency and as a blocking choke for the ignition pulses.

This object is attained in accordance with this invention where the core of the choke is composed of at least one ferrite core and transformer plates.

There exists at the present time a certain prejudice against using a core made of transformer plates in a high frequency choke because, at higher frequencies, transformer plates show high eddy current losses. Actually, however, when used in a welding machine, there is no constant high frequency load, the ignition pulses being single pulses of extremely short duration (1 to 2 µs). When the behavior of air chokes which are connected to the ignition device was examined, it was surprisingly found that the insertion of a bar core made of a transformer plate package does not affect the ignition properties in any way. Neither damping nor an increase can be noted. The pulses are so short that the molecular magnets of the transformer plates do not have time to react. Therefore, these tests and the knowledge obtained therefrom make it possible to adapt a bar core choke optimally to the requirements of smoothing and to adjust its inductance accordingly. With an added ferrite core, the inductance in the low current range is now raised for the high frequency pulses, for example, by a factor of 5. This ferrite core can be very small, because it can already go into saturation starting at, for example, 10 Ampères.

Consequently, by the use of a very cost-effective bar core of transformer plates, a small and low-resistance resistance structure was obtained. From a cost perspective, this means that ferrite presently is about twenty times as expensive as transformer plates and that ferrite can only absorb approximately ⅛ of the inductance. The true cost relation therefore is 1:160 for the core material alone.

The invention will be described in detail by means of the drawings.

DESCRIPTION OF PREFERRED EMBODIMENTS

Figure 1:
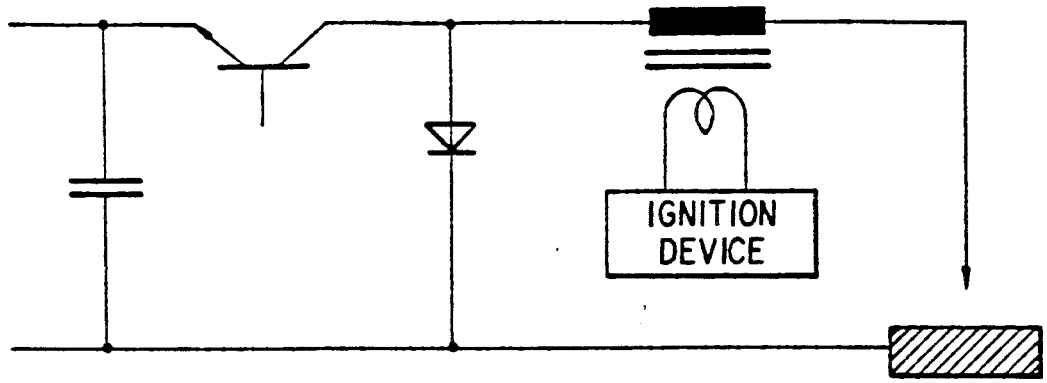
FIG. 1 shows the insertion of a choke in accordance with the invention in a clocked welding machine.

FIG. 1 shows the basic block diagram of a clocked current source where the choke is located at the output. An ignition device is also shown which transfers its pulse currents to an additional coil of the choke. Because the diode is conductive if correctly polarized, the high voltage induced in the choke appears across the arc gap.

Figure 2:
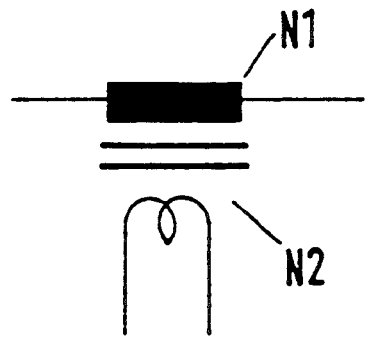
FIG. 2 shows the block diagram of the choke.

FIG. 2 shows the block diagram of the choke. N1 is the actual choke coil and N2 are, for example, three coils through which the high voltage ignition device can input its pulse currents. The ratio of N1 to N is the voltage transmission ratio for the ignition circuit.

Figure 3:
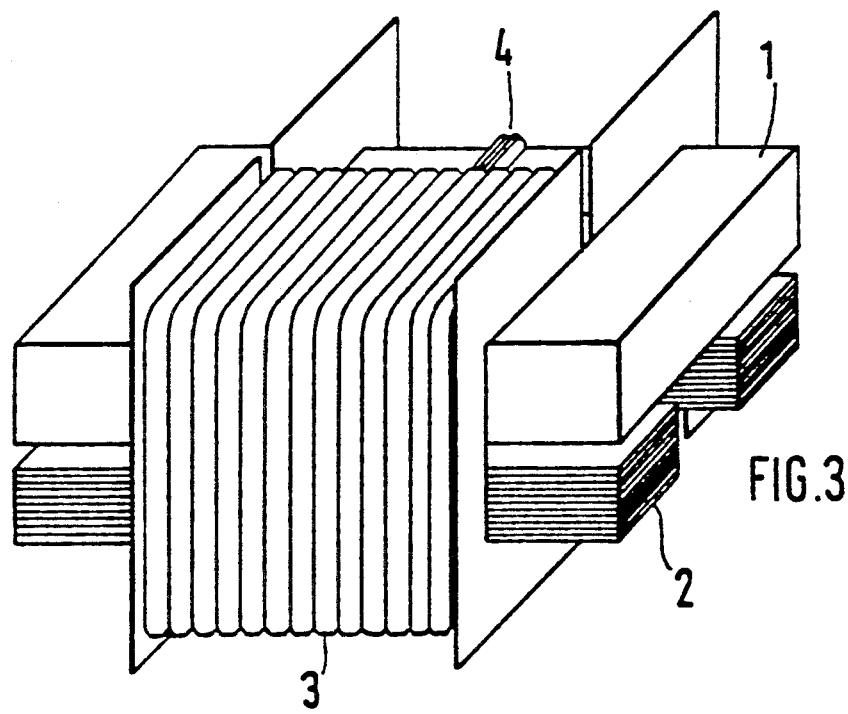
FIG. 3 shows a possible structural design.

FIG. 3 shows a possible structural design of a choke with ignition coil. The coil 3 of the choke with a number n1 of windings is disposed on a first coil body. A few windings of a second coil 4 are disposed on a second coil body. Two bar packages of transformer plates 2 are used as cores for the two coil bodies and are inserted through the two coil bodies. The closed ferrite core 1 is composed of two U-shaped core sections which have been inserted from both sides into the two coil bodies. The ferrite core 2 generates the initial inductance for the ignition pulses.

I claim:

1. In a choke in combination with a clocked current source and a high voltage ignition device for one of a TIG welding machine and a plasma cutting installation, the choke being simultaneously used as a smoothing choke for the clocked current source and as an ignition transmitter for the high voltage ignition device, the improvement comprising:

a core of the choke comprising at least one ferrite core (1) and at least one transformer plate (2).

* * * * *